United States Patent
Zhu et al.

(10) Patent No.: US 7,433,936 B2
(45) Date of Patent: Oct. 7, 2008

(54) CONNECTIVITY OBJECTS UNDER A MOBILE DEVICE MANAGEMENT TREE

(75) Inventors: Yuhang Zhu, Bellevue, WA (US); Suresh Natarajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 10/797,962

(22) Filed: Mar. 11, 2004

(65) Prior Publication Data

US 2005/0204068 A1 Sep. 15, 2005

(51) Int. Cl.
*G06F 15/177* (2006.01)
(52) U.S. Cl. .................................. 709/220; 709/252
(58) Field of Classification Search ................ 709/220, 709/252
See application file for complete search history.

(56) References Cited

U.S. PATENT DOCUMENTS

| | | | | |
|---|---|---|---|---|
| 6,711,592 B2* | 3/2004 | Ono | ......................... | 707/204 |
| 6,885,860 B2* | 4/2005 | Bahl et al. | ................ | 455/414.1 |
| 6,952,422 B2* | 10/2005 | Yamaguchi | ................. | 370/401 |
| 7,243,164 B2* | 7/2007 | Vegge | ......................... | 709/252 |
| 7,292,846 B2* | 11/2007 | Mittal | ......................... | 455/418 |
| 7,293,077 B1* | 11/2007 | Teo et al. | .................... | 709/221 |
| 2002/0029287 A1* | 3/2002 | Yemini et al. | ............... | 709/238 |
| 2005/0136908 A1* | 6/2005 | Shell et al. | .................. | 455/418 |

* cited by examiner

*Primary Examiner*—Krisna Lim
(74) *Attorney, Agent, or Firm*—Merchant & Gould

(57) ABSTRACT

The present invention is provides a system and method for managing connectivity objects and their associated parameters for a mobile device. The connectivity parameters are stored in a tree structure. For example, a proxy may be a node in the tree with its connectivity parameters listed as leafs. Similarly, a network access point (NAP) object may be a node within the tree. The parameters stored within the tree may be created, modified, deleted, and queried remotely or locally. Any portion of the tree may be modified or queried without having to send the entire tree to the device. Provisioning and modification of the tree is enabled via eXtensible Markup Language (XML). A wireless access protocol (WAP) sub tree is defined under the proxy object. The NAP object may also be used to help manage Wi-Fi connections and desktop pass-through connections. A vendor specific sub tree is also included within the tree that may be used to contain vendor specific settings.

28 Claims, 7 Drawing Sheets

```xml
<?xml version="1.0" encoding="UTF-8"?>
<SyncML>
    <SyncHdr>
        <VerDTD>1.1</VerDTD>
        <VerProto>SyncMLDM/1.1</VerProto>
        <SessionID>1</SessionID>
        <MsgID>1</MsgID>
        <Target>
          <LocURI>My_Mobile_Device</LocURI>
        </Target>
        <Source>
          <LocURI>http://www.UMS.com</LocURI>
        </Source>
    </SyncHdr>
    <SyncBody>
        <Replace>
        <CmdID>2</CmdID>                    610
            <Item>
                <target> <LocURI>./Con/Proxy/UMSProxy1/Name</LocURI> </target>
                <data>The UMS HTTP Gateway</data>
            </Item>
        </Replace>
        <Replace>
            <CmdID>3</CmdID>                620
            <Item>
                <target><LocURI>./Con/NAP/UMSISP1/Name</LocURI></target>
                <data>The UMS Network Access Point</data>
            </Item>
        </Replace>
    </SyncBody>
</SyncML>
```

*Fig. 6*

CONNECTIVITY OBJECTS UNDER A MOBILE DEVICE MANAGEMENT TREE

BACKGROUND OF THE INVENTION

Provisioning mobile devices can be difficult and time consuming. As the capability of mobile devices continues to increase, the number of parameters needed to be provisioned also increases. The parameters include connectivity parameters associated with a mobile device that may also be quite extensive. Although standards groups, such as the Open Mobile Alliance (OMA), are working on developing a framework for initial provisioning of various parameters, there is still much development that needs to be done.

SUMMARY OF THE INVENTION

The present invention is directed towards providing a system and method for managing connectivity objects and their associated parameters that are associated with a mobile device.

According to one aspect of the invention, the connectivity parameters are stored in a tree structure. For example, a proxy may be a node in the tree with its connectivity parameters listed as leafs. Similarly, a network access point (NAP) object may be a node within the tree.

According to another aspect of the invention, the parameters stored within the tree may be created, modified, deleted, and queried remotely or locally. Any portion of the tree may be modified or queried without having to send the entire tree to the device. For example, an operator may change a single parameter within the tree by referencing only the relevant portion of the tree.

According to another aspect of the invention, provisioning and modification of the tree is enabled via eXtensible Markup Language (XML). XML provides operators and corporations a well-known and standardized mechanism to help in managing the connectivity settings in mobile device.

According to yet another aspect of the invention, a wireless access protocol (WAP) sub tree is defined under the proxy object. This helps to manage WAP gateway specific settings.

According to another aspect of the invention, the NAP object may be used to help manage Wi-Fi connections and desktop pass-through connections.

According to still yet another aspect of the invention, a vendor specific sub tree may be included within the tree that may be used to contain vendor specific settings.

BRIEF DESCRIPTION OF THE DRAWINGS

FIG. 6 illustrates exemplary XML to update the name of a proxy and a name of a NAP.

DETAILED DESCRIPTION OF THE PREFERRED EMBODIMENT

Generally, the present invention is directed towards providing a system and method for managing various mobile device network connectivity parameters using a tree structure. For example, a proxy may be a node in the tree with its connectivity parameters listed as leafs. Similarly, a network access point (NAP) object may be a node within the tree. The parameters stored within the tree may be created, modified, deleted, and queried remotely or locally. Any portion of the tree may be modified or queried without having to send the entire tree to the device.

Illustrative Operating Environment

Figure 1:
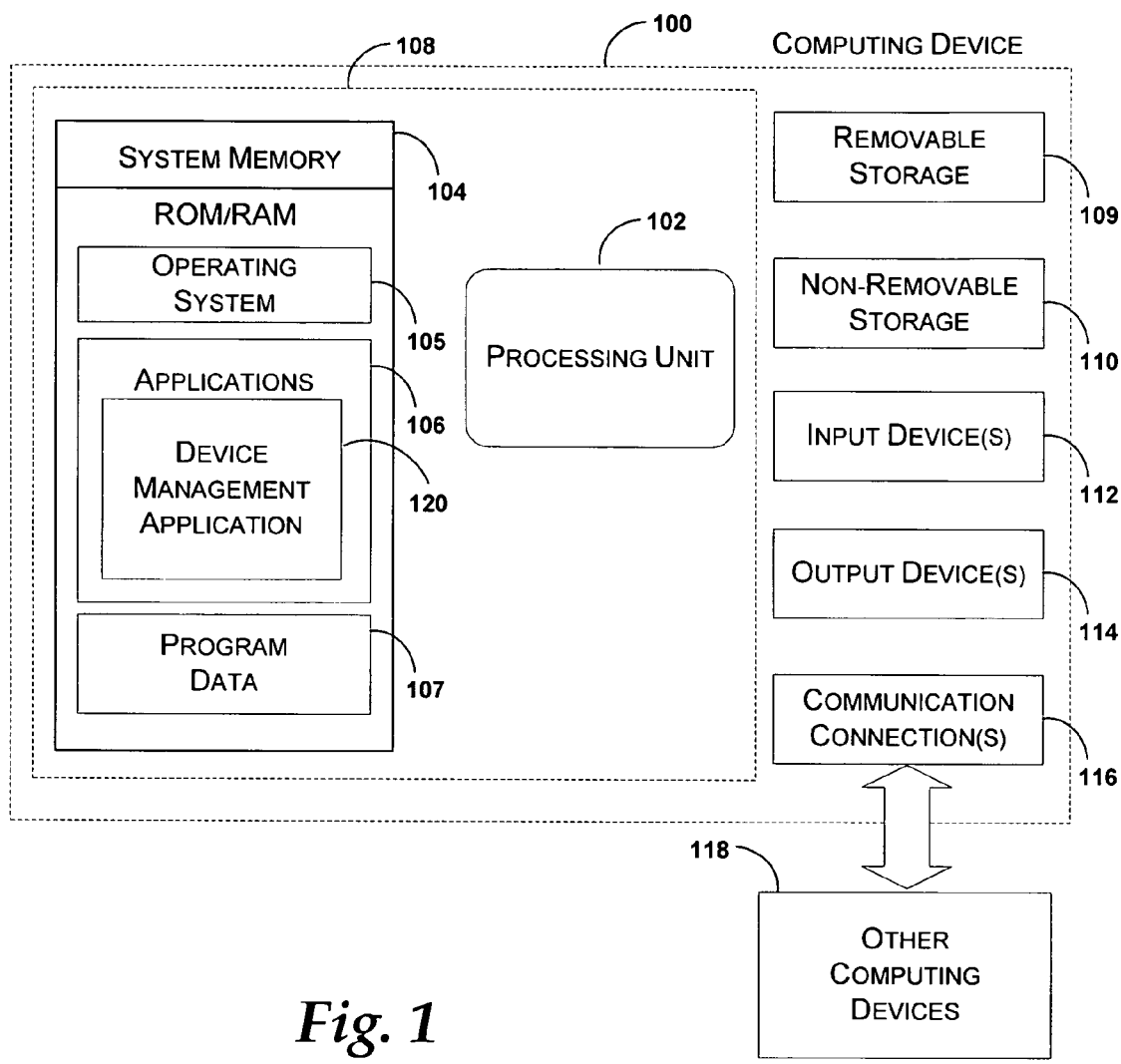
FIGS. 1 and 2 illustrate exemplary computing devices that may be used according to exemplary embodiments of the present invention.

With reference to FIG. 1, one exemplary system for implementing the invention includes a computing device, such as computing device 100. According to one embodiment, computing device 100 is configured as a server that interacts with devices in a network to manage connectivity settings. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes device management application 120. Device management application 120 is configured to perform operations relating to managing connectivity objects associated with mobile devices. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
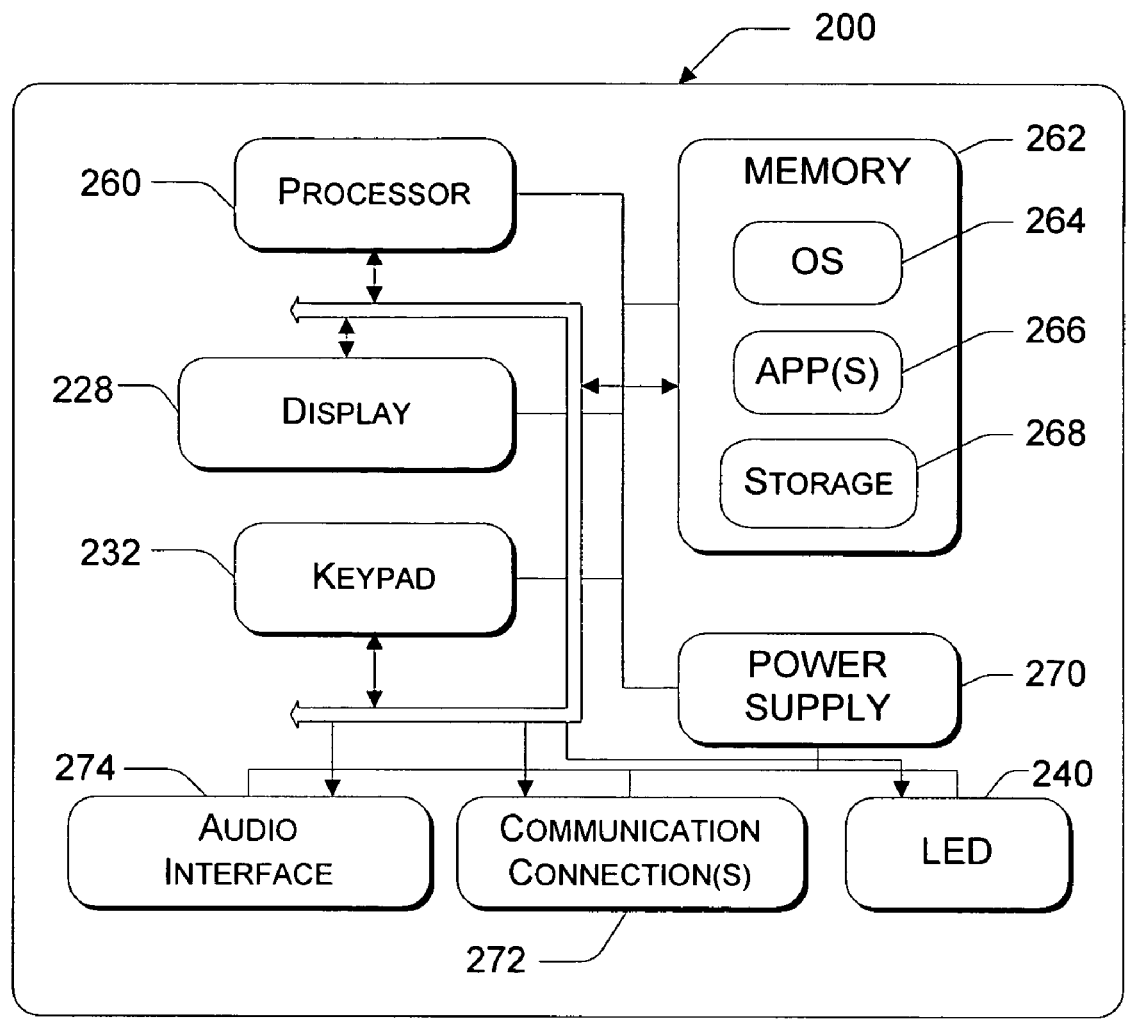

FIG. 2 illustrates a mobile computing device that may be used according to an exemplary embodiment of the present invention. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then could also act as an input device.

One or more application programs 266 are loaded into memory 262 and run on the operating system 264. A connectivity application resides on mobile computing device 200 and is configured to provide operations relating to managing connectivity parameters associated with mobile device 200. The connectivity application may reside in the hardware or software of the device. Mobile computing device 200 also includes non-volatile storage 268 within memory 262. Non-volatile storage 268 may be used to store persistent information which should not be lost if mobile computing device 200 is powered down. For example, storage 268 may store a connectivity object tree.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection, such as wireless interface layer 272, that performs the function of transmitting and receiving wireless communications. The wireless interface layer 272 facilitates wireless connectivity between the mobile computing device 200 and the outside world. According to one embodiment, transmissions to and from the wireless interface layer 272 are conducted under control of the operating system 264. In other words, communications received by wireless interface layer 272 may be disseminated to application programs 266 via operating system 264, and vice versa.

Illustrative Mobile Device Management Connectivity System

Figure 3:
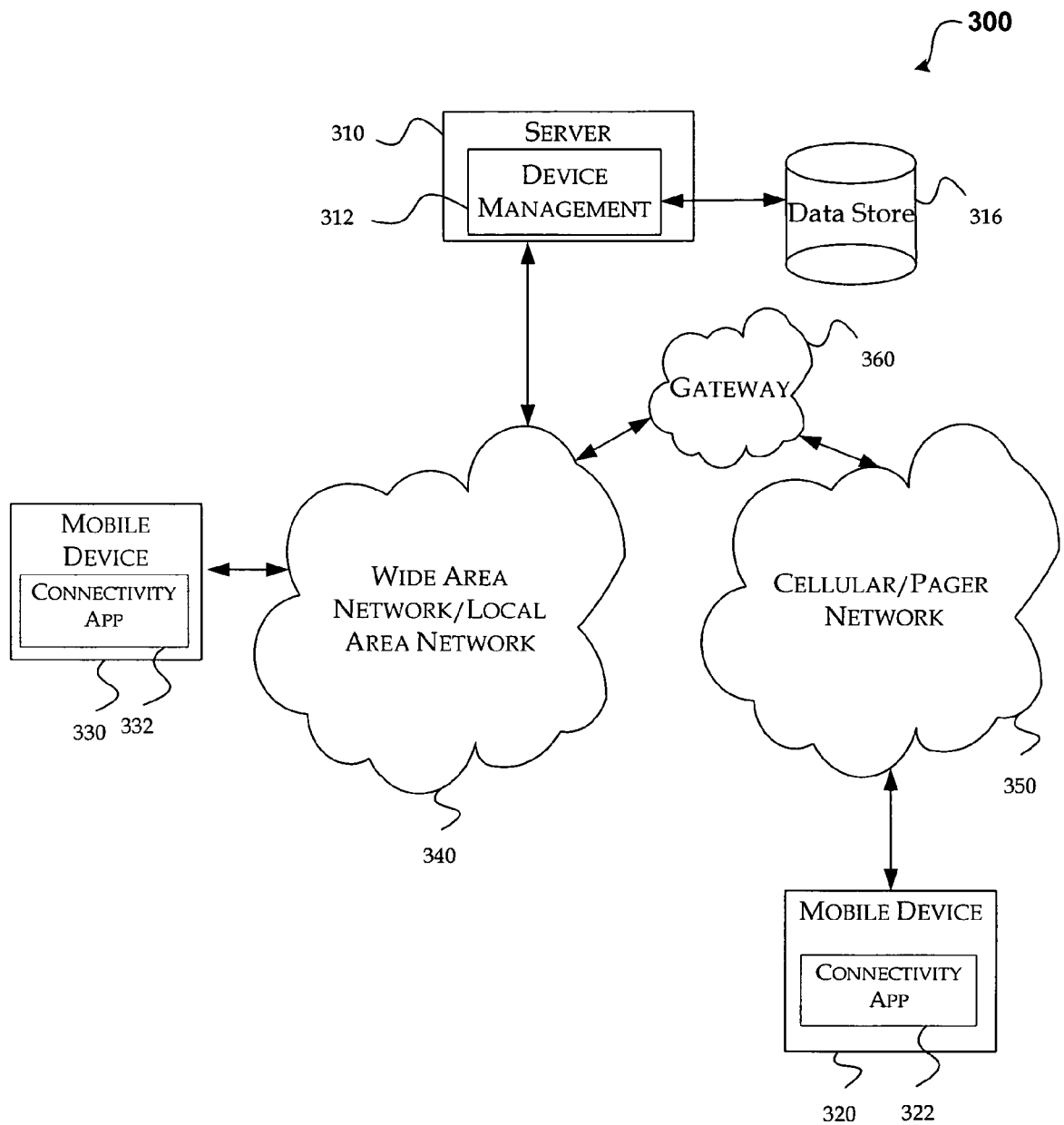
FIG. 3 is a functional block diagram generally illustrating a mobile device management connectivity system.

FIG. 3 is a functional block diagram generally illustrating a mobile device management connectivity system 300, in accordance with aspects of the invention. Server 310, mobile computing device 330, and mobile computing device 320 are computing devices such as the ones described above in conjunction with FIG. 1 and FIG. 2. Server 310 is configured to run device management application 312. Device management application 312 provides data and operations relating to network connectivity settings for mobile devices, such as the connectivity settings associated with mobile computing device 320 and mobile computing device 330. Data store 316 is configured to store the connectivity parameters associated with proxies and NAPs within a tree structure (See FIGS. 4 and 5 for exemplary tree structure). The connectivity data may be transmitted over a wide area network (WAN)/local area network (LAN) 340 or a cellular pager/network to the mobile computing devices. One example of a WAN is the Internet that connects millions of computers over a host of gateways, routers, switches, hubs, and the like. An example of a LAN is a network used to connect computers in a single office. A WAN may connect multiple LANs. Networks 340 and 350 may also be directly linked.

Initially, upon boot-up, mobile devices 320 and 330 do not include the connectivity parameters required to contact services or content through various protocols, such as the WAP protocol. A connectivity application, such as 322 or 332, residing on mobile device 320 or mobile device 330, is configured to interact with device management application 312 on server 310 to manage the connectivity parameters associated with the mobile device. The functionality that is initially provisioned to the mobile device includes network transport connectivity information. This includes parameters for proxies (See FIG. 4) and parameters for network access points NAPs (See FIG. 5) that are to be used.

Generally, the term "proxy" refers to a computing device, such a server, that sits between two networks. The proxy intercepts requests to the server to determine if it can fulfill the request itself. If the request can not be fulfilled, the request is forward to the server. A proxy generally includes an address, such as an IP address.

The term "Network Access Point" (NAP) refers to a physical access point that is an interface point between the device and the network. The NAP generally has an address, such as a telephone number, and an access bearer. The network access point parameters define network bearers that may be used. The clients, however, are not required to support any particular bearers.

Upon boot-up, server 310 provisions the mobile devices with provisioning information that defines connectivity parameters associated with the mobile device. According to one embodiment, server 310 delivers the provisioning information as binary XML documents as described in the OMA Client provisioning specification entitled "Provisioning Content Version 1.1" version dated Nov. 12, 2002 which is hereby incorporated in its entirety by reference. After the initial provisioning, server 310 may update, query, delete and/or add the connectivity settings on the mobile devices by accessing the relevant portion of the connectivity tree.

Applications 322 and 332 and device management application 312 may communicate using any one of several client-server protocols. According to one embodiment, messages sent from server 310 to the mobile devices are sent as http messages with the connectivity tree data represented by XML.

Cellular/pager network 350 is a network responsible for delivering messages to and receiving messages from wireless devices. Cellular/pager network 350 may include both wireless and wired components. For example, cellular/pager network may include a cellular tower that is linked to a wired telephone network. Typically, the cellular tower carries communication to and from mobile devices, such as cell phones, notebooks, pocket PCs, long-distance communication links, and the like. Server 310 may also locally connect with mobile devices via wireline or wireless transport.

Gateway 360 routes messages between cellular/pager network 350 and WAN/LAN 340. For example, server 310 may send data addressed to mobile computing device 320 through gateway 360. Gateway 360 provides a means for transporting the message from the WAN/LAN 340 to cellular/pager network 350. Conversely, a user with a device connected to a cellular network may be accessing the Web. Gateway 360 allows hyperlink text protocol (HTTP) messages to be transferred between WAN/LAN 240 and cellular/pager network 250. More gateways may be used within the system (not shown).

Once the mobile device receives the network connectivity parameter data, the mobile device sends a status message to server 310 indicating whether the desired action was successful. Once the mobile device has received the entire tree, such as upon boot-up, only affected portions of the tree may be sent to the mobile device in order to update the tree. Computing devices 320 and 330 may interact with their own local copies of the connectivity tree at any point.

Figure 4:
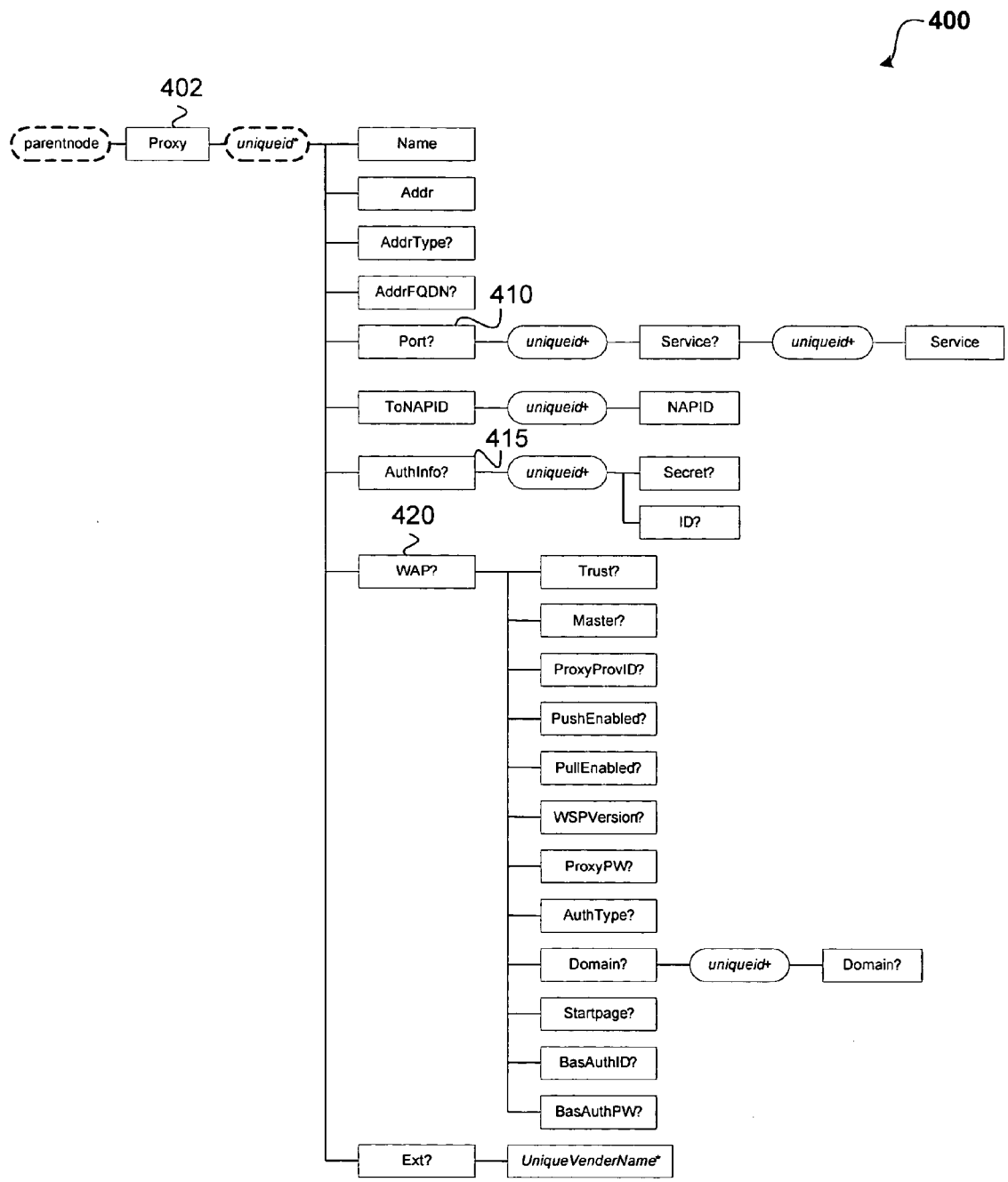
FIG. 4 illustrates a proxy object with an exemplary list of settings.
Figure 5:
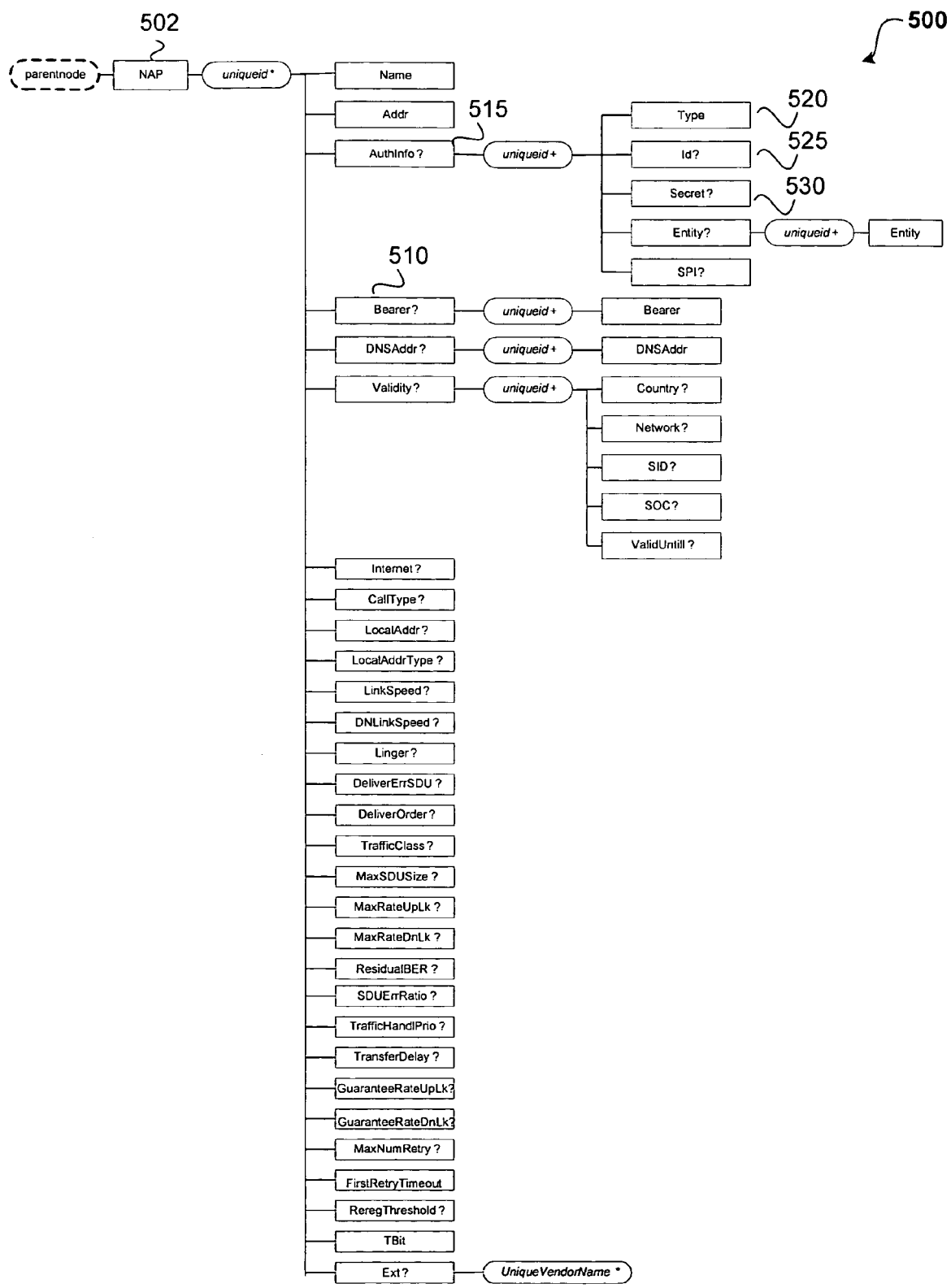
FIG. 5 shows a NAP object with an exemplary list of settings.

FIGS. 4 and 5 are diagrams showing how proxy and NAP objects are structured in an object tree, in accordance with aspects of the invention. The diagrams include exemplary list of settings, but could include more or less settings. For example, settings that may be included within the tree may also be found in the Open Mobile Alliance's paper entitled "Provisioning Content Version 1.1" version 12-Nov.-2002.

FIG. 4 illustrates a proxy object with an exemplary list of settings, in accordance with aspects of the invention. The exemplary list is not a complete list of settings that may be placed under a proxy object. As illustrated, diagram 400 includes a proxy (402) with the following informative nodes: Name, Addr, AddrType, AddrFQDN, Port including the following leafs (uniqueID, Service, uniqueID, Service), to NAPID with the following leafs (uniqueID, NAPID), AuthInfo with the following leafs (uniqueID (Secret and ID), a WAP leaf along with associated WAP parameters, and any vendor specific extensions (Ext).

As illustrated, WAP 420 includes the following parameters: Trust; Master; ProxyProvID; PushEnabled; PullEnabled; WSPVersion; ProxyPW; AuthType; Domain (uniqueid, Domain); Startpage; BasAuthID; and BasAuthPW. If any of the parameters defined in WAP could be used for general proxy parameters, these parameters could be put under the node "uniqueid" under Proxy node 402 directly.

When proxy node 402 is created, the uniqueids are instantiated. The "*" in the diagram means that the node could exist zero or more times. The "?" means that the node may or may not exist. A "+" means that the node could exist once or more. The nodes without the above special markings exist one time.

For the node "uniqueid" under Proxy node 402, the proxy id or a hash value of the proxy id could be used. The port number (410) could be used to for the node "uniqueid" under Port node 402. The authentication type could be used for the node "uniqueid" under AuthInfo node 415. The WAP proxy parameters could be used by other proxies by placing them directly under the Proxy/uniqueid node directly.

The vendor specific extensions provides a place within the tree for a vendor to include any parameters that are special for the particular device.

FIG. 5 shows a NAP object with an exemplary list of settings, in accordance with aspects of the invention. Other settings may also be placed under NAP object.

As illustrated, NAP object 502 includes the following settings: Name, Addr; AuthInfo; Bearer (uniqueid and bearer); DNSAddr (uniqueid and DNSAddr); Validity; Internet; CallType; LocalAddr; LocalAddrType; LinkSpeed; DNLinkSpeed; Linger; DeliverErrSDU; DeliverOrder; TrafficClass; MaxSDUSize; MaxRateUpLk; MaxRateDnLk; ResidualBER; SDUErrRatio; TrafficHandlPrio; TransferDelay; GuaranteeRateUpLk; GuaranteeRateDnLk; MaxNumRetry; FirstRetryTimeout; Rereg Threshold; TBit; Ext (unique vendor name). The AuthInfo setting (515) includes the following settings: type 520; Id 525; Secret 530; Entity; SPI. The Validity setting includes the following settings: Country; Network; SID; SOC; and ValidUntil.

The network access point id or the hash of the NAP id could be used to for the node "uniqueid" under NAP node 502.

As illustrated, NAP object 502 may be used to manage a Wi-Fi connection. The value for bearer leaf node 510 is used to identify the Wi-Fi bearer. For example, "WiFi" or some similar word could be used to identify the bearer.

The value for the type leaf node (520) under AuthInfo interior node 515 is used to identify the authentication type used by Wi-Fi. For example, WEP may be used if WEP authentication is used. Similarly, CERT may be used if certificate based authentication is used.

Secret leaf node 525 may be used to specify the Wi-Fi certificate or WEP key. Id leaf node 530 could be used to specify the user name and domain.

The NAP object may also be used to manage a DTPT (desktop pass-through) connection. In this case, the value for Bearer leaf node 510 is used to identify the pass-through bearer. For example, desk-top-pass through (DTPT) or similar word could be used to identify the bearer. The Id leaf node (525) under AuthInfo interior node 515 could be used to specify the user name and domain if required by the DTPT. The Secret leaf node (530) could be used to specify the password if required by the DTPT.

FIG. 6 illustrates exemplary XML to update the name of a proxy and a name of a NAP, in accordance with aspects of the invention. Updates to the parameters within the tree may be modified by sending just the portion of the tree that affects the parameters. For example, suppose an operator desires to change the name of a proxy and a NAP. In this case, the parameter to be changed is identified in the tree (610 and 620) by providing the location of the parameter within the tree. Target 610 identifies the location of the proxy name parameter to change along with the name data "The UMS HTTP Gateway.". Target 620 identifies the location of the NAP name parameter to change along with the name data "The UMS Network Access Point." The following is the relevant XML that is sent to the mobile device to change the names of a proxy and a NAP.

```
<SyncBody>
    <Replace>
    <CmdID>2</CmdID>
        <Item>
            <target><LocURI>./Con/Proxy/UMSProxy1/Name</LocURI>
            </target>
            <data>The UMS HTTP Gateway</data>
```

```
        </Item>
    </Replace>
    <Replace>
        <CmdID>3</CmdID>
        <Item>
            <target><LocURI>./Con/NAP/UMSISP1/
            Name</LocURI></target>
            <data>The UMS Network Access Point</data>
        </Item>
    </Replace>
</SyncBody>
```

The other parameters within the trees may be similarly changed. For example, any of the parameters shown in FIGS. 4 and 5 may be updated or queried using similar XML.

Figure 7:
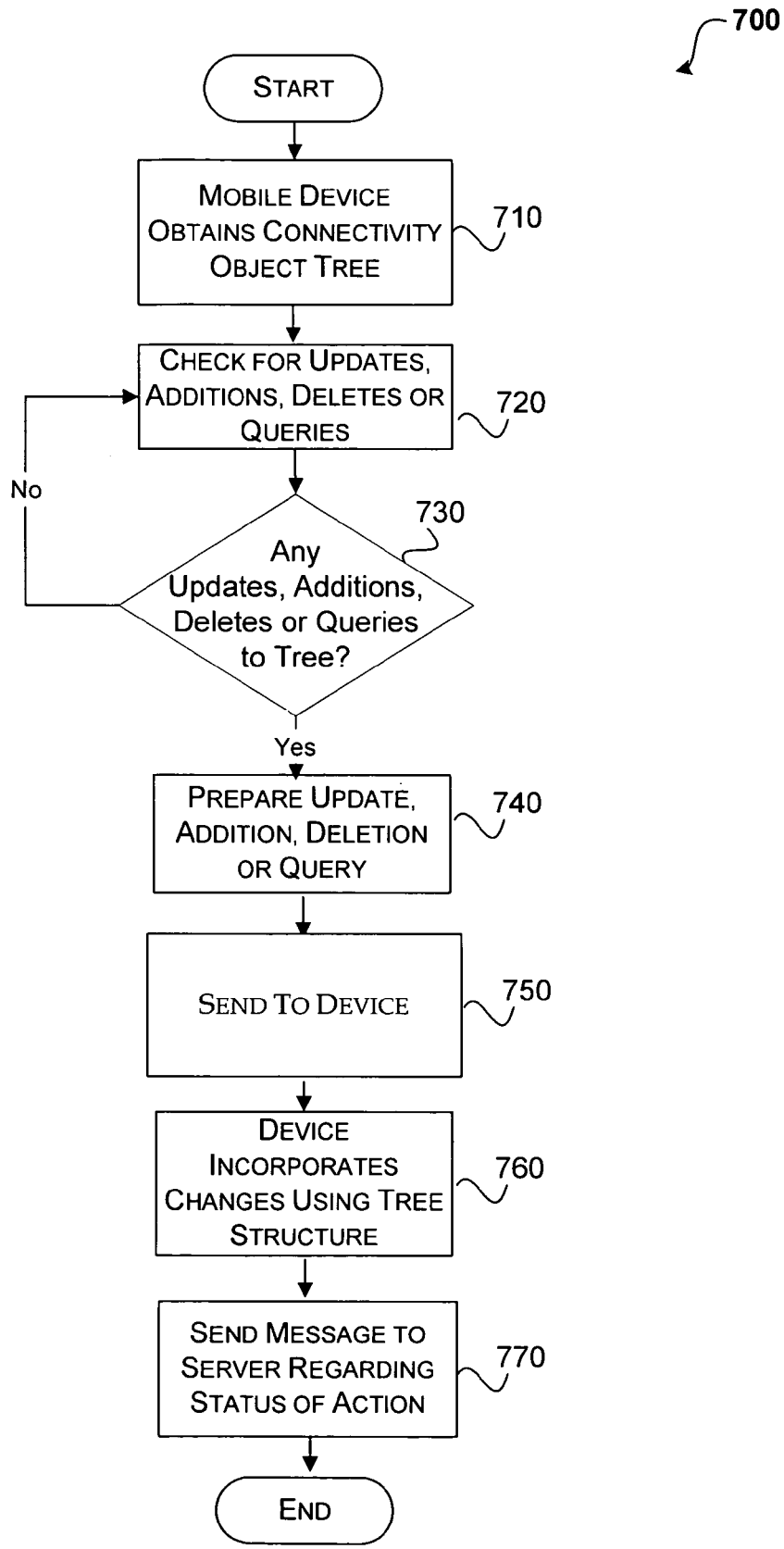
FIG. 7 shows a process for managing connectivity objects for a mobile device, in accordance with aspects of the invention.

FIG. 7 shows a process for managing connectivity objects for a mobile device, in accordance with aspects of the invention. After a start block, the process flows to block 710 where the mobile device obtains the connectivity object tree, such as the trees shown in FIGS. 4 and 5. According to one embodiment, a server provides the entire tree to the device upon initialization of the mobile device.

Moving to block 720, a check is made for any updates or queries to the connectivity parameters stored within the tree.

Transitioning to decision block 730, a determination is made if any updates or queries or additions or deletes are made to the tree. When there are not any updates, queries, additions or deletes, the process returns to block 720. When there are changes, the process flows to block 740 where an update, query, addition, and/or delete is prepared. According to one embodiment, since the tree is already stored in its entirety at the mobile device, the update or query includes only the portion(s) of the tree that are affected by the change or query (See FIG. 6 and related discussion).

Moving to block 750, the relevant tree section and any update data is sent to the mobile device. At block 760, the device attempts to incorporate the change or respond to the query by locating the parameter within the tree and either updating its value or returning the value at the location.

The process then moves to block 770, where a message is sent back to the server regarding the status of the action. For example, when successful in making the change, the device sends a message indicating success. Similarly, when the change fails, a message indicating the update failed is sent to the server. The process then steps to an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing a connectivity object for a mobile device, comprising:
    obtaining a tree structure that includes connectivity parameters associated with the mobile device as part of the tree structure; and
    incorporating at least a portion of the tree structure into the mobile device.

2. The method of claim 1, wherein the connectivity object is selected from a proxy object and a Network Access Point (NAP) object.

3. The method of claim 2, further comprising sending at least the portion of the tree structure to the mobile device.

4. The method of claim 3, further comprising representing the tree structure as XML.

5. The method of claim 1, wherein at least one of the connectivity parameters associated with the mobile device is changed, deleted, or queried without sending the entire tree structure to the mobile device.

6. The method of claim 2, further comprising adding at least one object to the Proxy and NAP object tree structure.

7. The method of claim 2, further comprising deleting at least one object from the Proxy and NAP object tree structure.

8. The method of claim 2, wherein the NAP object may be used to manage at least one of a Wi-Fi connection and desktop pass-through (DTPT) connection.

9. The method of claim 2, wherein the tree structure includes a location for vendor specific extension.

10. The method of claim 2, wherein the tree structure includes a WAP subtree.

11. A system for managing a connectivity object for a mobile device, comprising:
    a server including a network communication device coupled to a network and a data store configured to store connectivity parameters associated with the mobile device, and a device management application configured to perform actions, including:
    preparing a tree structure representing connectivity parameters associated with the connectivity object to a mobile device; and
    sending at least a portion of the tree structure to the mobile device;
    the mobile device including a network communication device coupled to the network and a local data store, and a connectivity application that is configured to perform actions, including:
    receiving the portion of the tree structure from server that includes connectivity parameters associated with the mobile device;
    incorporating the connectivity parameters; and
    storing the tree structure in the mobile device.

12. The system of claim 11, wherein the connectivity object is selected from a proxy object and a Network Access Point (NAP) object.

13. The system of claim 11, wherein the actions performed by the device management application further comprise representing the tree structure as XML.

14. The system of claim 12, wherein the actions performed by the device management application further comprise adding at least one object to the Proxy and NAP object tree structure.

15. The system of claim 12, wherein the actions performed by the device management application further comprise deleting at least one object from the Proxy and NAP object tree structure.

16. The system of claim 13, wherein at least one of the connectivity parameters associated with the mobile device may be changed, deleted, or queried without sending the entire tree structure to the mobile device.

17. The system of claim 12, wherein the NAP object may be used to manage at least one of a Wi-Fi connection and desktop pass-through (DTPT) connection.

18. The system of claim 13, wherein the tree structure includes a location for vendor specific extenstion.

19. The system of claim 13, wherein the tree structure includes a WAP subtree.

20. A computer-readable medium having computer executable instructions for managing a connectivity object for a mobile device, the instructions comprising:
    defining a tree structure that includes connectivity parameters associated with the mobile device;
    storing the tree structure; and
    incorporating the tree structure into the mobile device.

21. The computer-readable medium of claim 20, wherein the connectivity object is selected from a proxy object and a Network Access Point (NAP) object.

22. The computer-readable medium of claim 21, further comprising sending at least the portion of the tree structure to the mobile device.

23. The computer-readable medium of claim 21, further comprising representing the tree structure as XML.

24. The computer-readable medium of claim 23, wherein the NAP object may be used to manage at least one of a Wi-Fi connection and desktop pass-through (DTPT) connection.

25. The computer-readable medium of claim 24, wherein the tree structure includes a location for vendor specific extension.

26. The computer-readable medium of claim 24, wherein the tree structure includes a WAP subtree.

27. The computer-readable medium of claim 23, further comprising adding at least one object to the Proxy and NAP object tree structure.

28. The computer-readable medium of claim 23, further comprising deleting at least one object selected from the proxy NAP tree structure.

* * * * *